Patented Oct. 28, 1947 2,429,877

UNITED STATES PATENT OFFICE 2,429,877

PREPARATION OF ALPHA KETO ALIPHATIC AMIDES

William F. Gresham, Wilmington, Del., assignor to E. I. du Pont de Nemours & Company, Wilmington, Del., a corporation of Delaware No Drawing. Application November 30, 1945, Serial No. 632,080

5 Claims. (Cl. 260—561)

This invention relates to a process for the preparation of amides of keto acids and more particularly to their preparation by the oxidation of amides of hydroxy acids.

An object of the present invention is to provide a process for the oxidation of the amides of hydroxy acids to the corresponding amides of the keto acids. Another object is to provide a process for the preparation of dialkyl amides of keto acids by the oxidation of corresponding dialkyl amides of hydroxy acids. Yet another object is to provide a process for the preparation of N,N-dimethyl pyruvamide from N,N-dimethyl lactamide. Other objects and advantages of the invention will hereinafter appear.

In its broader aspects the invention relates to the oxidation of a hydroxy substituted organic acid amide to convert the hydroxyl group thereof to a keto group, the oxidation being carried out under vapor phase conditions in the presence of a suitable oxidation catalyst. The reaction may be illustrated generically by Equation 1.

(1) 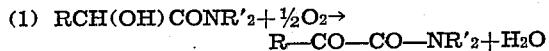
$$RCH(OH)CONR'_2 + \tfrac{1}{2}O_2 \rightarrow R-CO-CO-NR'_2 + H_2O$$

wherein the R and R' groups are similar or dissimilar alkyl groups such as methyl, ethyl, $n$ and isopropyl, and $n$ and isobutyl and higher alkyl groups although the R group may be hydrogen.

More specifically the invention is illustrated by Equation 2 wherein N,N-dimethyl lactamide is oxidized to dimethyl pyruvamide.

(2) 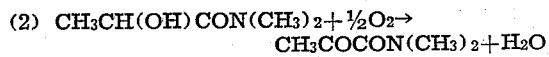
$$CH_3CH(OH)CON(CH_3)_2 + \tfrac{1}{2}O_2 \rightarrow CH_3COCON(CH_3)_2 + H_2O$$

The conversion of the hydroxyl to the keto group in accord with the invention is conducted at temperatures ranging between 350 and 500° C. and preferably between 400 and 425° C. Atmospheric pressure is preferably employed although superatmospheric or subatmospheric pressures may be used if desired. It has been found that the oxidation proceeds in the presence of air, or other gaseous mixture of oxygen and an inert gas, the latter being employed to effect thermal control. The oxygen is introduced into the reaction zone at a space velocity ranging between 100 and 5000 with a preferred space velocity in the proximity of 600–800. Concurrently with the introduction of the oxygen the amide is introduced in its vapor state with a space velocity ranging between 200 and 10,000 with a preferred range between 1000 and 1500, the inert gas such as nitrogen being adjusted at a space velocity which may range between 0 and 100,000 to remove exothermic heat and to maintain proper temperature. The space velocity is the unit volume of gas flowing per hour over a unit volume of catalyst, the gas being measured under standard temperature and pressure conditions.

Any suitable oxidation catalyst may be employed, such, for example, as the metals and metal oxides, e. g., platinum, cobalt, manganese, aluminum, nickel, iron or combinations thereof, silver catalysts having been found to be particularly efficient for the reaction. Oxidation catalysts, generally, may be used such as are described in chapter VI of "Catalysis in Organic Chemistry," by Sabatier and Reid, 1923.

The examples illustrate preferred embodiments of the invention in which parts are by weight unless otherwise stated.

*Example 1.*—A reaction tube was charged at the inlet portion with granular quartz and at the outlet portion with silver helices. The tube was externally heated and prior to introduction of the reactants was heated to a temperature of about 315° C. N,N-dimethyl lactamide was vaporized and preheated to a temperature of about 205° C. being introduced into the quartz-filled zone of the tube. Air which has been preheated to a temperature of about 230° C. was mixed with the preheated N,N-dimethyl lactamide and the mixture passed into the catalyst zone. The reaction started immediately upon the introduction of the amide into the reaction zone and a strong exothermic reaction commenced, the temperature of which must be controlled for optimum yields. In order to effect this control, preheated nitrogen was introduced with the air in sufficient quantities to hold the temperature of the reaction between a temperature of 416 and 455° C. The N,N-dimethyl lactamide was introduced at a space velocity of about 1320, the air at about 3400 and nitrogen at about 15000. The run was conducted for 1.7 hours under the aforesaid conditions, giving a product which upon distillation produced these fractions:

1. 58–61°/5 mm_____g__ 24.9
   $N_D^{25°}$ * _____ 1.4441

Free carbonyl No. 464.7, 464.2 vs. 487.5 theory for N,N-dimethyl pyruvamide.

2. 46–50°/2 mm _____g__ 4.4
   $N_D^{25°}$ * _____ 1.4445
3. 60–62°/2 mm_____g__ 12.2
   $N_D^{25°}$ * _____ 1.4550

* Refractive index.

Since pure N,N-dimethyl pyruvamide has a boiling point of 53.8°/4.5 mm. and refractive index/25°=1.4445, whereas N,N-dimethyl lactamide boils at 68°/4 mm. and has a refractive index at 25° of 1.4559, it is apparent that fractions 1 and 2 are essentially N,N-dimethyl pyruvamide while fraction 3 is recovered starting material. The conversion realized was 51.8% and the yield 65.8%.

*Example 2.*—The continuous run described in Example 1 was repeated and continued for 7.7 hours. The conversion was in this instance 48.8% and the yield 77% with a catalyst temperature throughout the run of between 406° and 419° C.

By substituting for the N,N-dimethyl lactamide any of the other hydroxy acid amides described above, corresponding keto amides are produced. These keto amides, and more particularly dimethyl pyruvamide, are valuable intermediates in the preparation of many organic compounds such as the amino acids.

I claim:

1. A process for the preparation of an N,N-dilower alkyl alpha keto aliphatic monobasic acid amide which comprises oxidizing a compound, having the formula RCH(OH)CONR'$_2$ in which R and R' are lower alkyl groups, by subjecting it to oxidation with air in the presence of an inert gas at a temperature between 350 and 500° C. and in the presence of an oxidation catalyst.

2. A process for the preparation of N,N-dialkyl pyruvamide which comprises oxidizing in the vapor phase N,N-dialkyl lactamide to an N,N-dialkyl pyruvamide at a temperature between 350 and 500° C. and in the presence of an oxidation catalyst.

3. A process for the preparation of N,N-dimethyl pyruvamide which comprises oxidizing to an N,N-dimethyl pyruvamide in the vapor phase N,N-dimethyl lactamide at a temperature between 350 and 500° C. and in the presence of an oxidation catalyst.

4. A process for the preparation of N,N-dimethyl pyruvamide which comprises passing oxygen, nitrogen and vapors of N,N-dimethyl lactamide through a reaction zone, the temperature within the zone being controlled between 350 and 500° C. by the flow of nitrogen, the vapors of N,N-dimethyl lactamide being introduced at a space velocity of between 200 and 1000, the oxygen at a space velocity between 100 and 5000 and the nitrogen at a space velocity between 0 and 100,000, the reaction being conducted in the presence of a silver oxidation catalyst.

5. A process for the preparation of N,N-dimethyl pyruvamide which comprises passing through a reaction zone containing a silver catalyst, oxygen, nitrogen and vapors of N,N-dimethyl lactamide, the oxygen being introduced at a space velocity between 600 and 800, the N,N-dimethyl lactamide at a space velocity between 1000 and 1500 and nitrogen at a space velocity sufficient to hold the temperature of the reaction between about 400 and 425° C.

WILLIAM F. GRESHAM.

REFERENCES CITED

The following references are of record in the file of this patent:

UNITED STATES PATENTS

| Number | Name | Date |
| --- | --- | --- |
| 1,614,195 | Haussler | Jan. 11, 1927 |
| 1,627,091 | Haussler | May 3, 1927 |
| 2,025,804 | De Groote et al. | Dec. 31, 1935 |
| 2,180,730 | Cox | Nov. 21, 1939 |
| 2,320,232 | Hanford et al. | May 25, 1943 |